United States Patent Office 3,740,347
Patented June 19, 1973

3,740,347
ACID STABLE MOLECULAR SIEVE PRODUCTS
Harvey M. Rosen, Laurel, and Hanju Lee, Columbia, Md., assignors to W. R. Grace & Co., New York, N.Y.
No Drawing. Filed June 24, 1971, Ser. No. 156,503
Int. Cl. B01j 11/40
U.S. Cl. 252—455 Z
10 Claims

ABSTRACT OF THE DISCLOSURE

Crystalline zeolites, synthetically produced or naturally occurring, can be stabilized against acid attack by treatment with an aqueous solution containing potassium silicate, sodium silicate, basic silica hydrosol, sodium tetraborate, sodium pyrophosphate or mixtures of these materials. Such treated zeolites are particularly more stable in gaseous acidic environments.

---

This invention relates to acid stable crystalline zeolite sieves. Further, this invention relates to buffer solutions useful for making crystalline zeolite molecular sieves acid stable; and the methods of making these zeolite molecular sieves acid stable by the use of these buffer solutions.

Crystalline zeolites are hydrated aluminosilicate naturally occurring or synthetic materials having a continuous open framework of linked tetrahedral grouping around silicon and aluminum atoms. When heated, water is driven off, but the open framework is preserved. As a result, these zeolites have a unique ion exchange capacity and are useful as ion exchangers and adsorbents. The useful properties for these materials are beyond a comprehensive enumeration. They are useful in removing trace metals from aqueous or other liquid streams, for adsorbing gaseous materials such as carbon oxides, sulfur oxides, hydrogen sulfide, nitrogen, oxygen, moisture and so on. And the actual practical uses which utilize these properties are also very numerous.

However, one characteristic problem concerning crystalline molecular sieves is their susceptibility to attack by acids. The actual degree of susceptibility varies from zeolite to zeolite, and also the degree to which the normally found alkali ions in the zeolite have been replaced with other ions. But all exhibit this disadvantage, and thus many uses are curtailed. This invention is directed to solving this problem and thus extend the range of utility of crystalline zeolite molecular sieves. By the use of the coating of this invention, zeolite molecular sieve products, synthetic or naturally occurring, in any shape or form, can be made resistant to attack by acids or to gases which decompose to produce acids on contact with a molecular sieve.

Others in the art have recognized this problem and have proposed methods for producing zeolites of greater stability. Indicative of these efforts is U.S. Pat. 3,287,281. In the process of this patent, the zeolite is agglomerated by the use of (1) an alkali metal hydroxide, (2) a source of alkali reactive silica in the form of a finely divided material, and (3) a finely divided source of an alkaline earth metal oxide or hydroxide. By the mixing of these components together with clinoptilolite, zeolite agglomerates resistant to acids have been produced. However, this requires that the zeolite product be in an agglomerated form, and further requires the use of more complex forming steps. By the use of the present invention, zeolites of any shape or form can be produced with a subsequent treatment to promote acid resistance. This creates greater versatility since as a final treating step zeolites can be produced in a form having a general use, and then treated by specific reagents so that the zeolite can be tailored to a defined use. This versatility decreases substantially the amount of warehousing and plant space required.

The treating of this invention essentially comprises the contacting of the zeolite molecular sieves with a solution of sodium silicate, potassium silicate, basic silica hydrosol, sodium tetraborate, sodium pyrophosphate or mixtures of these materials. This zeolite is then removed from the treating solution, dried and optionally activated. In use, these treated zeolites have a high acid stability and can survive in environments wherein untreated zeolites are attacked.

Broadly, the process of this invention can be used to enhance the acid stabilities of any zeolite, either synthetic or naturally occurring. This, therefore, includes the commercially significant synthetic zeolites designated A, X and Y by the Linde Division of the Union Carbide Corporation, and Z-12, Z-14 and Z-14 US by the Davison Division of W. R. Grace & Co., as well as the naturally occurring zeolites such as faujasite, mordenite, chabazite, erionite, clinoptilolite, gmelinite, sodalite, ferrierite, stilbite and heulandite. These zeolites in essentially any form or shape are contacted with an aqueous solution of sodium silicate, potassium silicate, sodium tetraborate, sodium pyrophosphate, or mixtures of these materials, to impart acid resistance. These solutions penetrate the zeolite pores and adhere to the surfaces of the zeolite acting as an acid buffer. The siliceous material deposited in and on the zeolite acts particularly to protect the alumina component of the crystalline zeolite. After treating with the siliceous solution, the zeolite is dried and usually activated. The zeolite is then in a condition for process application.

As set out, the zeolite can be in essentially any form. This zeolite can, therefore, be a powder, an extrusion or pellet in the shape of cylinders, spheres or pills. Any of these shapes or forms can be treated as long as the material is submerged in the treating solution.

The treating solution itself is most effectively an aqueous solution. The concentration of the treating materials in the solution is very effectively in the range of 10 to 70 percent by weight, and most usefully about 15 to 30 percent by weight. The amount zeolite which can be treated with such a solution comprises from about 1 to 5 times the total weight of the solution. This ratio of treating may be in a single batch or in a series of batches. The treating solution is then replenished in the buffering component and reused.

The treating of the zeolite is most simply by submerging the zeolite in the treating solution, with or without recirculation of the solution for reuse, and maintaining the temperature between about 10° C. and 95° C. The use of mixing is also advantageous, but not necessary. Another method is to continually spray the treating solution onto a bed of zeolite. A further method is to countercurrently contact the zeolite with the treating solution. Any of these methods may be used. The time of contacting, although it will vary depending on the technique used, will generally be from about .1 to 10 hours, and preferably about 1 to 3 hours.

After completion of the treating period, the zeolite is removed from the treating solution, for example, by simply draining or by filtration, and dried at about 100–200° C. For subsequent use as an adsorbent, the treated and dried zeolite is heated to 350–650° C. for from about .5 to 10 hours to remove closely bound waters. This is commonly designated as activating the zeolite.

When Zeolite Z-12 has been so treated, it has proven very useful as an adsorbent for the removal of water from refrigerant gases, i.e., Freons. The Freons, which is a commercial brand name of a group of organic chemicals known as fluorinated chlorohydrocarbons, tend to partially decompose on contact with zeolitic surfaces, producing acidic halogen acids. However, when the zeolites have been treated by one of the processes of this invention, there is little or no attack of the zeolite by these acids.

EXAMPLE I

A (250 g.) sample of 4–8 mesh size Zeolite Z–12 (also known as Zeolite 4A) green beads (unactivated) was placed in 1 liter resin kettle. The kettle contained 500 ml. of a solution (11.25 percent $K_2O$, 14.4 percent $SiO_2$, 74.4 percent $H_2O$) at 80° C. The solution was circulated by a small pump through the beads for two hours. The heat was removed from the kettle and the circulation continued for one more hour. The beads were filtered on a Buchner funnel, dried at 110° C. and activated at 700° F.

EXAMPLE II

A (250 g.) sample of 4–8 mesh Zeolite Z–12 activated (700° F.) beads was placed in a 1 liter round bottom flask with 500 ml. of a saturated solution (at room temperature) of $Na_4P_2O_7 \cdot 10H_2O$. The flask was rotated under house vacuum on a rotary evaporator for 1 hour. The solution was then filtered off a Buchner funnel and the beads dried at 110° C. and reactivated at 700° F.

EXAMPLE III

The acid stability of the samples was tested by contacting 5 gm. of treated beads with 0.5 M HCl in the presence of 3 M NaCl (50 ml. of solution). Six flasks were employed and after continuous shaking one flask is removed each hour for six hours. The beads are washed chloride free, dried, actiavted at 700° F. and the X-ray crystallinity and $H_2O$ adsorption measurements performed.

TABLE I.—$H_2O$ ADSORPTION

| Hours acid treated | Percent at— | | |
|---|---|---|---|
| | 5% R.H. untreated 4A | 10% R.H. $K_2O \cdot 2SiO_2$ treated 4A | 5% R.H. $Na_4P_2O_7$ treated 4A |
| 0 | 16.6 | 17.4 | 15.9 |
| 1 | 14.3 | 17.2 | 17.3 |
| 2 | 14.4 | 17.2 | 17.5 |
| 3 | 12.3 | 16.4 | 17.6 |
| 4 | 11.9 | 16.3 | 15.8 |
| 5 | 9.4 | 16.8 | 16.5 |
| 6 | 10.3 | 16.3 | 17.0 |
| | X-ray crystallinity (arbitrary units) | | |
| 0 | 248 | 155 | 205 |
| 1 | 204 | 119 | 245 |
| 2 | 237 | 140 | 224 |
| 3 | 224 | 143 | 208 |
| 4 | 211 | 154 | 221 |
| 5 | 197 | 143 | 223 |
| 6 | 186 | 140 | 232 |

EXAMPLE IV

This example illustrates the acid stability of 4–8 mesh size Zeolite Z–12 beads treated with various solutions of this invention. The acid stability was treated by contacting 5 gms. of treated beads with 0.5 M HCl in the presence of 3 M NaCl (50 ml. of solution). Six flasks were employed for each treated zeolite, with one flask removed each hour for six hours. The beads were washed chloride free, dried, activated at 700° F. and water adsorption measurements performed. The results of the water adsorption tests as well as the X-ray crystallinity are set out in Table II. X-ray crystallinity values are in relative numbers.

TABLE II

| Treatment time | Basic silica hydrosol | | Sodium tetraborate | | Sodium silicate | |
|---|---|---|---|---|---|---|
| | $H_2O$ capacity at 5% R.H. | X-ray crystallinity | $H_2O$ capacity at 5% R.H. | X-ray crystallinity | $H_2O$ capacity at 5% R.H. | X-ray crystallinity |
| Hours: | | | | | | |
| 0 | 16.53 | 229.3 | 15.59 | | 16.23 | 237.0 |
| 1 | 14.69 | 220.6 | 15.13 | 226.9 | 14.52 | 237.4 |
| 2 | 14.73 | 214.9 | 15.88 | 217.6 | 14.53 | 243.0 |
| 3 | 14.79 | 202.7 | 18.32 | 205.4 | 14.87 | 229.7 |
| 4 | 12.63 | 206.0 | 15.57 | 200.6 | 14.43 | 246.5 |
| 5 | 13.69 | 207.9 | 16.72 | 205.1 | 15.61 | 240.9 |
| 6 | 14.33 | 198.2 | 15.60 | 191.5 | 15.90 | 218.9 |

What is claimed is:

1. A method of enhancing the acid stability of zeolite molecular sieves comprising treating said zeolite molecular sieves with a solution of a buffering agent selected from the group consisting of silica hydrosol, sodium tetraborate, and mixtures thereof, separating said treated zeolite from said solution, and drying said treated zeolite.

2. A method as in claim 1 wherein said zeolite is a naturally occuring zeolite.

3. A method as in claim 1 wherein said zeolite is a Z–12 zeolite.

4. A method as in claim 1 wherein said zeolite is a Z–12 zeolite and said buffering agent is a silica hydrosol.

5. A method as in claim 1 wherein said zeolite is a Z–12 zeolite and said buffering agent is a sodium tetraborate-solution.

6. A method as in claim 1 wherein said treating is by contacting said zeolite with said solution of a buffering agent at a temperature of about 10 to 95° C., followed by separating said zeolite from said solution.

7. A method as in claim 6 wherein said zeolite is a naturally occurring zeolite.

8. A method as in claim 6 wherein said zeolite is a Z–12 zeolite.

9. A method as in claim 6 wherein said separated zeolite is dried and activated.

10. An acid stabilized zeolite composition comprising a zeolite coated with a buffering agent selected from the group consisting of silica hydrosol, sodium tetraborate, and mixtures thereof.

References Cited

UNITED STATES PATENTS

| | | | |
|---|---|---|---|
| 3,051,841 | 9/1962 | Gladrow et al. | 252—455 Z |
| 3,234,147 | 2/1966 | Drost et al. | 252—455 Z |
| 3,275,571 | 9/1966 | Mattox | 252—455 Z |
| 3,313,594 | 4/1967 | Wilson, Jr. | 252—455 Z |

CARL F. DEES, Primary Examiner